United States Patent [19]

Dunn

[11] 4,147,093
[45] Apr. 3, 1979

[54] SELF-ACTUATING FLUID HOLDING SYSTEM

[75] Inventor: Donnell L. Dunn, Terre Haute, Ind.
[73] Assignee: J. I. Case Company, Racine, Wis.
[21] Appl. No.: 774,235
[22] Filed: Mar. 4, 1977
[51] Int. Cl.² ................ F15B 11/00; F15B 13/00
[52] U.S. Cl. ........................................ 91/510; 91/518; 91/447; 91/463; 137/101
[58] Field of Search ............... 91/412, 413, 414, 463, 91/445, 165, 447; 137/101, 106

[56] References Cited

U.S. PATENT DOCUMENTS

| | | | |
|---|---|---|---|
| 2,152,021 | 3/1939 | Baumer | 91/463 |
| 2,956,577 | 10/1960 | Kirkham | 137/101 |
| 3,033,219 | 5/1962 | Erle | 137/101 |
| 3,094,042 | 6/1963 | Diener | 91/414 |
| 3,304,633 | 2/1967 | Hein | 91/414 |
| 3,437,103 | 4/1969 | Masao Yoshino | 137/101 |
| 3,847,059 | 11/1974 | Beck | 91/413 |
| 3,960,286 | 6/1976 | Spooner | 91/412 |
| 3,983,893 | 10/1976 | Nubson | 137/101 |

*Primary Examiner*—Martin P. Schwadron
*Assistant Examiner*—Abraham Hershkovitz
*Attorney, Agent, or Firm*—Arthur J. Hansmann

[57] ABSTRACT

The self-actuating fluid holding system includes a fluid pump and two fluid valves and two fluid motors all fluid-flow connected together. The valves are arranged to sense the proportionate flow therethrough and to the two motors, and when the flow is out of proportion, such as when one of the connecting lines or a connection breaks to permit the fluid to leak, then the valves have shut off closures which protect the system against fluid leakage.

4 Claims, 1 Drawing Figure

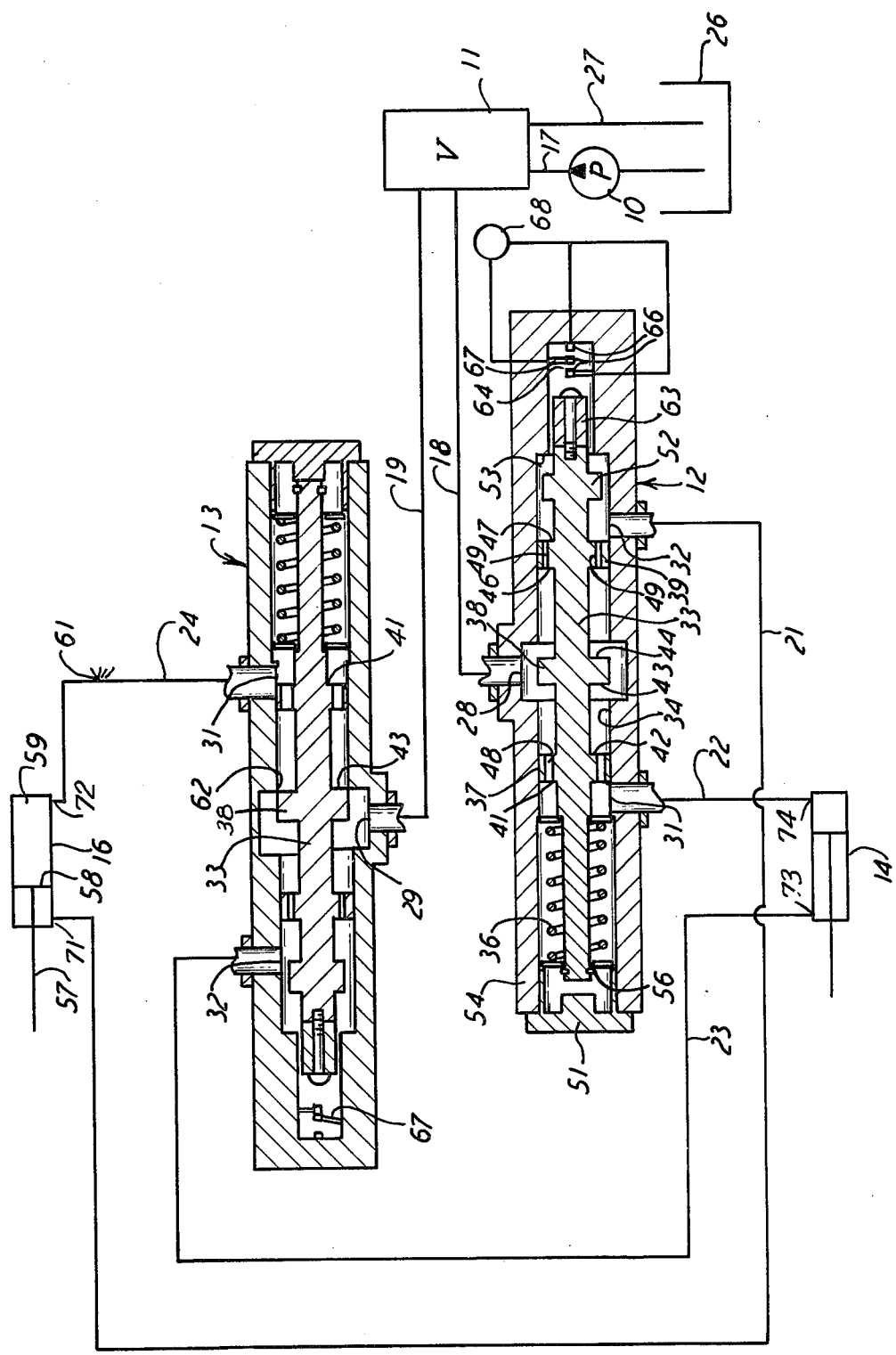

SELF-ACTUATING FLUID HOLDING SYSTEM

This invention relates to a self-actuating fluid holding system, and, more particularly, it relates to a fluid system which is arranged to automatically shut off at any portion of the system when that portion of the system suffers a line breakage or the like.

BACKGROUND OF THE INVENTION

Hydraulic systems which are subjected to fluid pressures are commonly subjected to leakage in the system, such as caused by the breakage of a connecting line or the like. When breakage occurs, the entire system can fail and the operator is left without control of the system since all of the fluid pressure can be lost or the system at least becomes ineffective.

The present invention provides a fluid system which is arranged to automatically respond to a breakage in a fluid line or to a leak in the system, and the system of this invention responds by automatically shutting off that portion, location, or branch of the system to avoid further leakage in the system and permit the remainder of the system to function in a safe manner.

Accordingly, the present invention provides for a self-actuating fluid holding system which automatically shuts off the flow of fluid to any portion of the system which may suffer a leak, such as a break in the line in the system at that location. Correspondingly, the system of this invention is arranged to permit the remainder of the system to function in a normal manner, while the leak or break remains in the other portion of the system, and thus there is a continuance of the operation of the system and the operator can therefore control the powered fluid motors or the like even during the time of the leak or break in the portion of the system.

In the specific embodiment for this invention, the system is arranged with two inter-connected fluid cylinder assemblies which will inherently lose their ability to perform their designated function in the event of a line failure and loss of fluid in a portion of the system. Also, the system shown herein utilizes two identical spool valves which sense the flow to each of the two cylinder assemblies, and in the event that the fluid flow to either of the two cylinder assemblies becomes sufficiently out of portion, such as when a line breaks or a leak occurs in the system, then the valve will close and avoid further leakage of fluid while the remainder of the system as it pertains to the two cylinder assemblies will continue to function.

Still further, a system of this invention can be arranged with a reactive switch and signal which responds in the event of a leak in the fluid pressure, and thus the operator is immediately informed as to the presence of the leak.

Other objects and advantages will become apparent upon reading the following description in light of the accompanying drawings.

BRIEF DESCRIPTION OF THE DRAWINGS

The drawing shows a diagrammatic view of a preferred embodiment of this invention, with the two shut-off valves thereof being shown on an enlarged scale and in section.

DETAILED DESCRIPTION OF THE PREFERRED EMBODIMENT

The drawings show the preferred embodiment of this self-actuating fluid holding system to include a fluid pump 10 and a control valve 11 and two shut-off or protective valves 12 and 13 and two fluid motors 14 and 16, which are in the form of cylinder assemblies. Connections, such as the connecting lines or hoses 17 and 18 and 19 and 21 and 22 and 23 and 24 fluid flow extend and thus connect the aforementioned pump, three valves, and two cylinder assemblies. The drawing further shows a tank or reservoir 26 and a fluid line 27 extending from the control valve 11 and to the tank 26.

Accordingly, a conventional and suitable supply of power can be applied to the fluid pump 10 to direct fluid under pressure and to the valve 11 which in turn may be of a standard arrangement under the control of the operator for directing fluid pressure to the two lines 18 and 19 which respectively extend to and fluid-flow connect with the two valves 12 and 13. Thus the valves 12 and 13 have a fluid port 28 and 29 which are connected with the connections or fluid lines 18 and 19, respectively, and the valves 12 and 13 also have fluid ports 31 and 32. In the actual showing, the valves 12 and 13 are identical in construction, and the showing simply shows the valves in reversed and inverted positions, and thus the two ports 31 and 32 are present in each of the valves 12 and 13 and are respectively identical as are the ports 28 and 29, in a manner hereinafter disclosed again.

Since the valves 12 and 13 are identical, the valve closure movable therein is also identical between the two valves, and the closure is shown in the form of an elongated spool 33 which can slide back and forth in the interior valve chamber 34. However, it will be noticed that the spools 33 are in slightly different positions in these identical valves 12 and 13. Each valve 12 and 13 has a compression spring 36 disposed therein and extending to the shouldered portion of the spool 33 to urge the spool or closure 33 to the fluid-flow open position, such as shown with the valve 12, and that means that the spool 33 has been urged to the right in the drawing. The spools 33 have several circularly projecting portions 37 and 38 and 39, and these portions all present oppositely-faced surfaces or shoulders, such as the surfaces 41 and 42 on projection 37 and surfaces 43 and 44 on projection 38 and surfaces 46 and 47 on projection 39. As such, the surfaces described are subjected to fluid pressure and thus axially shift the spool 33 within the spool chamber 34. Further, the projections 37 and 39 have fluid passageways 48 and 49 thereon. Thus, in the position of the spool for valve 12, fluid can move in and out of the port 28 and the chamber 34 and through the passageways 48 and 49 and in and out of the valve ports 31 and 32. Accordingly, the fluid can be passed to and from the connecting lines 21 and 22 and thus to and from the cylinder assemblies 14 and 16.

It will be further seen that each valve 12 and 13 has a fluid-tight end plug 51, and the spool 33 has a circular enlargement 52 which can move against a shoulder 53 in the valve housing which is designated 54, and thus the maximum axial movement of the spool 33 to the right and relative to the housing of valve 12 is limited, so the spool 33 will remain in a desired operative position. However, it will also be noticed that the spring 36 is mounted to be in end abutment with the valve housing 54 at the right end of the spring in valve 12 and it is also arranged to be in end abutment with the spool 33 through the snap ring 56 on the spool 33 and at the left end of the spring in the valve 12, and thus the spring 36 is effective in both directions for positioning the spool 33 in both valves.

As mentioned, the cylinder assemblies 14 and 16 are fluid motors, and they have first directions of operation and second directions of operation, depending upon the introduction and exit of the fluid pressure to the assemblies or motors 14 and 16. With regard to referring to the elements 14 and 16 as cylinder assemblies, it will be seen and understood that the fluid connection 21 extends to the rod end of the cylinder assembly 16 which therefore has a piston rod 57 and a piston 58 disposed within the cylinder 59. Also, the hose or connection 24 extends to the assembly 16 to connect to the cylinder head end thereof, in the conventional terminology. Likewise, the rod end and head end connections for the fluid connections or hoses 22 and 23 are shown related to the cylinder assembly 14. Of course it will therefore be understood that the motors or assemblies 14 and 16 actually have different fluid displacements between the opposite ends thereof, namely the head end and rod end, and thus the flow through one connection to one end is different from the flow to the other connection to the other end of each assembly 14 and 16. Likewise, the ports 31 and 32 are proportioned directly relative to the displacement or flow of the opposite ends of the assembly 14 and 16, and thus the port 31 in each of the valves 12 and 13 is larger than the port 32 in each valve 12 and 13, and the difference in port sizes 31 and 32 are in direct proportion to the difference in displacement in the motors or assemblies 14 and 16. With that arrangement, the valves 12 and 13 are constantly sensing the uniformity of fluid flow therethrough when the entire system shown and described is operating in either direction of pressurizing the rod end or the head end of the cylinder assemblies 14 and 16. Thus, the valve 11 controls flow to either line 18 or 19 and then to the respective valve 12 or 13. When flow is to the valve 12, for instance, fluid enters port 28 and chamber 34 and passes through the orifices 48 and 49 in proportion to the orifice sizes which in turn are proportioned to the flow required by the respective head and rod ends of the assemblies 14 and 16. That proportioned flow does not create any axial force on the spool 33, due to the equal pressure drop across the projections 37 and 38, as mentioned. Flow continues to the ports 31 and 32. Lines 21 and 22 then receive the flow, and likewise the opposite ends of assemblies 14 and 16, as desired. Return flow is then in the lines 23 and 24 and to the ports 32 and 31, respectively, and into the chamber 34 of valve 13 and to the port 29 and then to the line 19 and then to the valve 11 and reservoir 26.

However, when there is a variance in the flow of fluid to either end of either of the cylinders 14 and 16, then the valves 12 and 13 detect the difference and act to close in order to avoid the loss of fluid and the leakage which could be created by a break in the fluid line. For instance, assuming pressure in the line 19 and that the line 24 creates a break as shown by the indications at 61, it will then be understood that there will be less pressure in the connection 24 and thus less fluid pressure in the port 31 and in the adjacent portion of the chamber 34, compared to the port 29. In that instance, there will be less fluid pressure on the spool surfaces 41 and 43, and fluid will be flowing through chamber 34 to the right in valve 13 as fluid flows out the break 61. The force of the flow to the right is toward port 31, and thus the spool 33 in the valve 13 will shift to the position to the right, as shown in the drawing. In that position, the projecting portion 38 of the spool 33, being a circular projection, will engage the circular wall 62 and close the flow of fluid from the chamber 34 and of course that would be from the port 29 and also from the port 31. Accordingly, no additional fluid can escape through the broken line 24. However, fluid can still be under pressure in the line 23 as well as in the lines 21 and 22 through the operation of valve 11, and thus the operator still has power control over the fluid motors 14 and 16 at least to the extent that the load on assembly 16 applies fluid pressure in the line 21.

Further, it will be seen that the fluid passsageways 48 and 49 are of different sizes for flow therethrough, and the total area of all passageways 48 is larger than that of all passageways 49, and that corresponds with the greater size of the port 31 relative to the port 32 and, as mentioned, it also corresponds with the greater fluid displacement of the head end of the assembly 14 or 16, relative to the rod end thereof. Also, with the spools 33 arranged as described, they will force the proper proportion of fluid to each assembly 14 and 16, according to the loads and demands of the assemblies 14 and 16. Further, when the assemblies 14 and 16 are performing a function, the relative flow rates to each assembly are always constant, and this is true regardless of whether or not the assembly rods are moving in the same direction, that is, either extending or contracting. The actual relationship between these two flow rates is the same as the relationship between the fluid displacements for the cylinder assembly head ends and rod ends. Therefore, the relative sizes of the ports 31 and 32 are the same as the ratio between the two opposite ends of each assembly 14 and 16. As such, the entire fluid system is available for normal operation of the double acting elements 14 and 16 and it is also effective for shutting off in the event of the line breakage at 61, as described.

Further, each spool may have a signal in the form of a magnet 63 attached to one end thereof, and a magnetic responsive type of reed switch 64 is in the housing and under the influence of the magnet 63 and such that the switch 64 has electric contacts 66, with one thereof on a magnetically responsive reed 67 such that the reed 67 is in an open or non-contacting position when the magnet 63 is in a central position, however, the reed 66 may be sprung to a contact position with one contact 66, as in valve 13, and it may be repelled by the magnet to contact the other contact 66. A signal 68 extends from the reed 66 and to a location for the operator to see whether or not the contacts 66 are closed, according to the position of the magnet 63 which will close the contacts 66 when the spool shifts to the right, as shown in the valve 13 and the contacts 66 also closed when the spool shifts to the opposite position, all under the influence of the magnet 63. As such, there is a signal and warning system for the operator to detect the position of the spool 33, and each valve 12 and 13 can be arranged with the reed switch and the signal 68, as described in connection with valve 12.

Accordingly, in the embodiment shown, the assembly can be used for the steering of a tractor or such vehicle, and actually the valve 11 is therefore referred to as a steering valve, and the assemblies 14 and 16 are right and left steering cylinders of the conventional arrangement in that type of assembly. It can also be seen and understood that the elements 14 and 16 are arranged to have first direction movement and second direction movement, for purposes of general description, and these directions of course are determined by the pressurizing in the hoses or connections leading to each assembly 14 and 16. It will be seen that the valves 12 and 13 are each connected through one connection or line to each assembly 14 and 16, in the nature of cross-connections, and it will also be understood that the head end and rod end of each assembly 14 and 16 has a different fluid-flow capacity, as shown and described and the respective valve connections 12 and 13 and their ports 31 and 32 are proportioned to those respective flow capacities. Also, assemblies 14 and 16 have fluid connections or ports 71, 72, 73, and 74. Therefore, the assemblies 14 and 16 are double-acting assemblies, and flow into or out of either end of the assembly will not cause the spools 33 to shift to the closed position, and it is only when there is a leak or break in the line that the particular spool 33 will shut off to protect against further leakage of fluid. In accordance with the proportioning of the flow to and from the head and cylinder ends of the assemblies 14 and 16, and that being in proportion to the flow through the ports 31 and 32, the respective hoses or connections with the ports 31 and 32 are of capacity for accommodating the proportionate flow described herein.

What is claimed is:

1. A self-actuating fluid holding system, comprising a fluid pump and two fluid valves and two fluid motors all fluid-flow connected together and arranged to direct fluid through said valves and to and from said motors, said valves and said motors each having two fluid connections for entry and exit of fluid to and from said valves and said motors and with each of said motors having two different fluid-flow capacities and with each flow capacity being respectively proportional to each other and respectively proportional to said two fluid connections in a given proportion, said valves each having two fluid ports in fluid-flow connection with the respective said two fluid connections of said valves and with said ports being of fluid flow-through sizes in respective proportion to the said capacities of said motors, said valves each having one additional fluid connection in fluid-flow connection with said pump, said valves each having a movable valve spool operative on said two fluid ports for controlling fluid-flow communication between said fluid connections and said two fluid ports in accordance with fluid forces applied to said valve spools, said spools having a fluid sealing projection to stop fluid-flow from said pump to one of said two fluid ports, said spools each having two pairs of axially-faced surfaces exposed to fluid pressure intermediate said two fluid ports and with each of said surfaces having fluid passageways extending therethrough and in flow capacity in respective proportion to the said proportions in said two fluid ports in said valves for axial shifting of said spools in response to differential fluid pressures at said surfaces, a spring in abutment with each of said spools for centering said spools to a position with said sealing projection free from stopping flow to said two fluid ports, and said two fluid ports in each of said valves being of different fluid-flow sizes, and the first-mentioned said two fluid connections respectively fluid-flow connected between said two fluid ports and said motors in relation to said capacities of said motors, such that said valve spools are forced to closed positions when fluid flow in the first-mentioned said two fluid connections is different from said given proportion.

2. The self-actuating fluid holding system as claimed in claim 1, wherein said motors are arranged with two fluid ports for first direction and second direction drive of said motors and with respect to said fluid-flow capacities of said motors, and with said connections to said two fluid ports of each of said valves being respectively connected with said two fluid ports of each of said motors.

3. The self-actuating fluid holding system as claimed in claim 1, wherein said motors are fluid cylinder assemblies of the double acting type, and said assemblies each have a fluid port at the head end and at the rod end thereof, said two fluid ports in each of said valves being of different fluid-flow sizes, and with said two fluid connections being respectively connected between said fluid ports of said cylinder assemblies and of said valves with the smaller one of each two of said ports of said valves being connected with said ports of said cylinder assemblies at the rod ends of the latter.

4. The self-actuating fluid holding system as claimed in claim 1, wherein said two valves are of an identical construction.

* * * * *